United States Patent Office 2,856,097
Patented Oct. 14, 1958

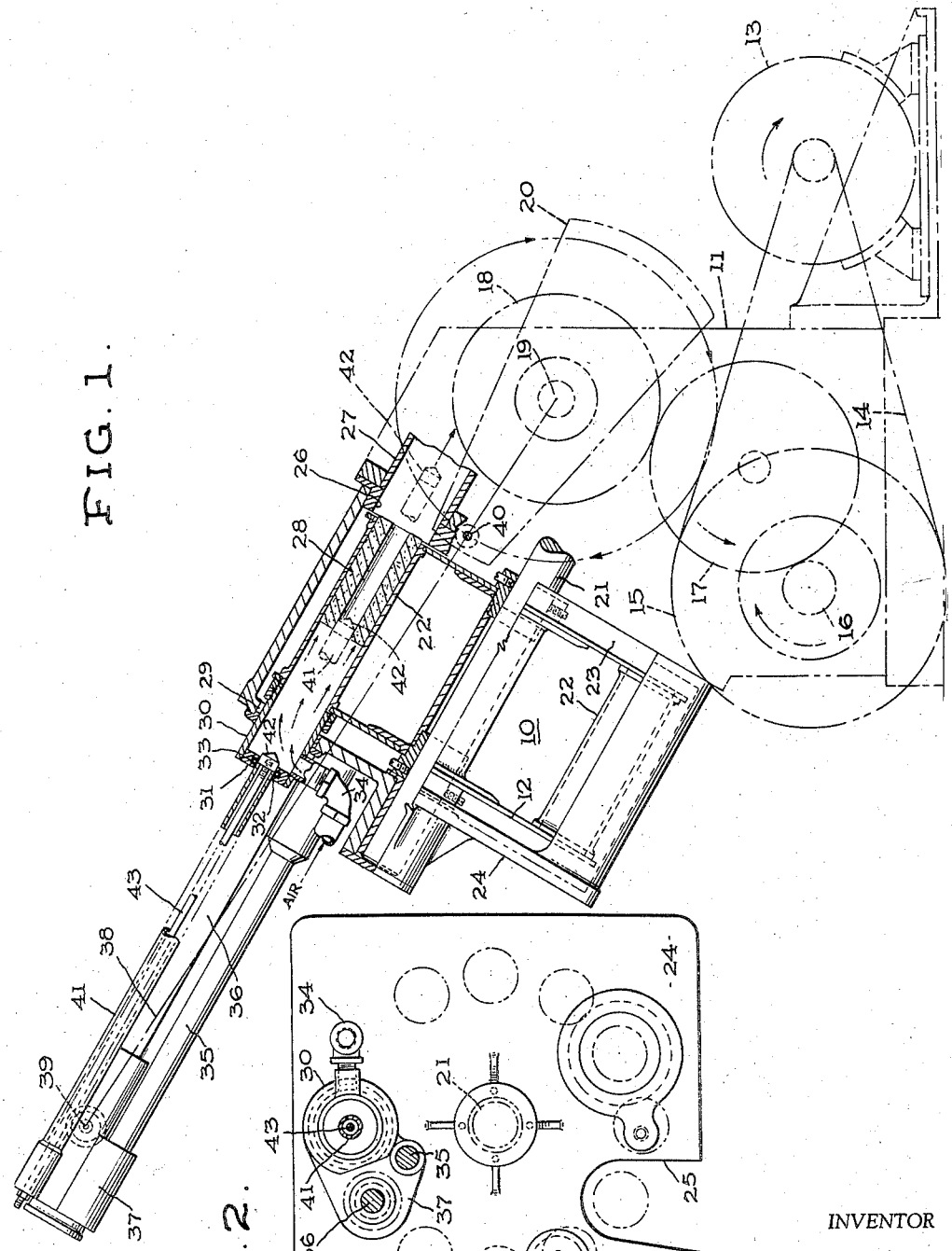

2,856,097

EJECTOR FOR SIZED AND CORED FRUIT

Malcolm McFaull, Jr., Honolulu, Territory of Hawaii, assignor to Hawaiian Pineapple Company, Limited, Honolulu, Territory of Hawaii, a corporation of the Territory of Hawaii Application January 13, 1958, Serial No. 708,498

6 Claims. (Cl. 221—81)

This invention relates to ejectors for sized and cored fruit and more particularly for such ejectors for use in Ginaca-type machines used in the coring and sizing of pineapples.

Machines of the Ginaca-type for sizing and coring pineapples have long been known and such a machine is described in U. S. Patent No. 1,112,130 granted to Henry G. Ginaca on September 29, 1914. In this structure sized pineapples are placed in chambers of a revolving turret and while in these chambers the ends of the pineapple are removed and the pineapple is cored. After coring the pineapple is removed from the turret by a mechanical pusher for conveyance to suitable slicing machines.

More recent adaptations of the Ginaca machine are shown in the Stanley Patents Nos. 2,195,193 and 2,320,054 where the turret is positioned on an inclined axis to facilitate the admission of the sized pineapple to the chambers of the turret. In these patents a mechanically actuated plunger is utilized to remove the sized and cored pineapple from the chamber of the turret at the discharge position.

In these machines compressed air has been utilized to move the sized pineapple in the chambers of the turret to bring the ends thereof into position for engagement with end removing knives. After the sized pineapple has been cored, however, it has heretofore been impossible to move the same in the chamber of the turret by compressed air because of air leakage through the core opening. It has heretofore been considered necessary to employ mechanical pushers to remove the pineapple from the chamber at the discharge position of the turret. These mechanical pushers tend to bruise and damage the fruit and to reduce the number of salable slices of pineapple which can be obtained.

The present invention overcomes the disadvantages of the mechanical type pusher at the discharge station of a Ginaca-type machine by employing compressed air to move the cored pineapple from the chamber by providing mechanical means for closing the core opening of the pineapple to prevent the escape of air therethrough. The mechanical means employed for closing the core opening of the pineapple follows the movement of the pineapple out of the chamber and while engaging the open end of the core opening exerts no force upon the pineapple and does not bruise or damage the fruit thus increasing the number of salable slices of pineapple which can be obtained.

It is therefore an object of the present invention to provide novel ejectors for sized and cored fruit in which the cored fruit is removed from the turret of a sizing and coring machine by compressed air.

Another object is to provide such novel ejectors in which the cored fruit is not bruised or damaged by the ejector.

Another object is to provide such novel ejectors in which the core opening of the fruit is closed by mechanical means which follows the fruit in its movement from the chamber of the turret, the movement of the fruit being caused solely by compressed air.

Another object is to provide such novel ejectors for use in Ginaca-type machines employed for sizing and coring pineapple in which the cored pineapple is removed from the turret of the Ginaca-type machine solely by compressed air to prevent bruising and damaging of the fruit.

Another object is to provide such novel ejectors which may be readily installed upon existing Ginaca-type machines without requiring extensive modification thereto and which operate in the timed sequence of the machine without requiring additional equipment.

Other and further objects of the present invention will appear from the following description of an illustrative embodiment thereof.

The novel ejectors of the present invention are capable of various mechanical embodiments one of which is shown in the accompanying drawing and is described hereinafter to illustrate the invention. This illustrative embodiment should in no way be construed as defining or limiting the invention and reference should be had to the appended claims to determine the scope of this inventive concept.

In the drawing, in which like reference characters indicate like parts,

Fig. 1 is a side view partly in section and partly diagrammatic showing an illustrative embodiment of an ejector for a Ginaca-type machine in accordance with the present inventive concept; and Fig. 2 is an end view, partly in section, as seen from the left in Fig. 1.

In Figs. 1 and 2 a Ginaca-type machine is generally indicated at 10 and is suitably mounted upon a base 11. The turret 12 of machine 10 is driven in stepwise rotation by a suitable electric motor 13 driving through belt 14 and drive wheel 15, the mechanism for providing stepwise rotation for turret 12 being omitted for clarity, it being understood that any suitable mechanism such as that shown in the Ginaca patent referred to above may be employed.

Rotation of wheel 15 rotates gears 16, 17, and 18, gear 18 being mounted upon shaft 19 which in turn supports crank arm 20.

Turret 12 is mounted for rotation upon shaft 21 and is provided with any suitable number of pineapple receiving chambers 22. The turret is completed by stationary end plates 23 and 24. End plate 24 is cut away at 25 to provide access to the chamber 22 at the loading station, it being understod that any suitable loading structure may be employed such as those shown in the two Stanley patents referred to above.

End plate 23 is suitably apertured at 26 to receive a conveyor 27 for the sized and cored pineapple from the discharge position of turret 12. As seen in Fig. 1, the discharge position of turret 12 is shown in cross-section and the cored and sized pineapple in the chamber 22 at the discharge position is shown in cross-section at 28.

End plate 24 of turret 12 is suitably apertured at 29 opposite aperture 26 to receive a cylindrical extension 30 which is closed by header 31. Header 31 is centrally bored at 32 and bore 32 is provided with a suitable sealing ring 33. An air conduit 34 opens through a wall of extension 30 and is provided with air under pressure from any suitable source.

Guides 35 and 36 are mounted on end plate 24 and extend parallel to each other and parallel to the axis of extension 30 and parallel to the axis of the adjacent chamber 22. A crosshead 37 is mounted for reciprocation upon guides 35 and 36. A suitable connecting rod 38, shown schematically in Fig. 1, is pivotally connected to crosshead 37 at 39 and to crank arm 20 at 40. When crank 20 is rotated about shaft 19 crosshead 37 will be moved in reciprocating movement on guides 35 and 36 toward and away from extension 30. Crosshead 37 carries tubular member 41 which passes through opening 32 in header 31 forming an airtight seal with ring 33 and carries a valve head or plug member 42 on the end of rod 43. Reciprocation of crosshead 37 therefore moves tubular member 41 in reciprocating movement and the stroke of crosshead 37 is so adjusted that plug 42 after insertion into the open core of pineapple 28 moves with pineapple 28 into conveyor 27.

The air admitted through pipe 34 is under relatively low pressure, about three pounds per square inch, and, when in the appropriate cycle of the machine plug 42 is moved into chamber 22 at the discharge position and enters and closes the core of pineapple 28, air pressure slowly builds up behind pineapple 28. When the air pressure reaches a sufficient value pineapple 28 is moved to the right as seen in Fig. 1 out of turret 22 into conveyor 27 with plug 42 following and remaining in the core opening to prevent escape of air. This gentle dashpot action prevents any bruising of pineapple 28 so that more slices of commercially acceptable pineapple can be obtained.

After pineapple 28 enters conveyor 27 it is moved by any suitable means such as by gravity to the slicing machine, not shown, and member 41 and plug 42 are returned to the left position shown in Fig. 1. Turret 12 is then rotated another step to bring another chamber 22 carrying a cored and sized pineapple into position for discharge from the machine.

It should now be apparent to those skilled in the art that the novel ejector of the present invention in every way satisfies the several objectives described above.

Changes in or modifications to the above described illustrative embodiment of this invention may now be suggested without departing from the present inventive concept. Reference should therefore be had to the appended claims to determine the scope of this invention.

What is claimed is:

1. In an ejector for a turret-type fruit sizing and coring machine rotated in stepwise rotation to a discharge position for the sized and cored fruit in which the turret is provided with a plurality of cylindrical fruit-receiving chambers, an air chamber forming an extension of the turret chamber at the discharge position, means for admitting air under pressure to said air chamber, a plug member in said air chamber mounted for movement into the core opening of the fruit and for movement with the fruit during discharge, and mechanical means operated in timed sequence with the stepwise rotation of the turret for moving said plug member into the core opening of the fruit whereby air pressure builds up behind the fruit and moves the fruit out of the turret chamber.

2. An ejector as described in claim 1 in which said mechanical means include guides extending parallel to the axis of the turret chamber at the discharge position, a crosshead mounted for reciprocation on said guides and a member carried by said crosshead and extending into said air chamber, said plug member being mounted on the end of said member in said air chamber.

3. In a pneumatic ejector for a Ginaca-type pineapple sizing and coring machine having a plurality of chambers for the pineapples arranged in a turret rotated to a discharge position after the pineapples are cored, an air chamber forming an extension of the turret chamber at the discharge position, means for admitting air under pressure to said air chamber, a plug member mounted for reciprocation along the axis of the turret chamber at the discharge position and within said air chamber and mechanical means operated in timed sequence with the rotation of said turret for moving said plug member into the core opening of the pineapple at the discharge position and for moving said plug member with the pineapple whereby air pressure builds up in said air chamber behind the pineapple and ejects the pineapple from the turret chamber.

4. An ejector as described in claim 3 in which said mechanical means include guides extending parallel to the axis of the turret chamber at the discharge position, a crosshead mounted for reciprocation on said guides and a tubular member extending into said air chamber, said plug member being mounted on the end of said tubular member in said air chamber.

5. In a pneumatic ejector for a Ginaca-type pineapple sizing and coring machine having a plurality of open ended chambers for the pineapples arranged in a turret rotated to a discharge position after the pineapples are cored, means for closing one end of the turret chamber at the discharge position, conveyor means communicating with the other end of the turret chamber at the discharge position, means for admitting air to the turret chamber at the discharge position adjacent said chamber closing means, a plug member mounted for reciprocation through said closing means along the axis of the turret chamber at the discharge position and mechanical means operated in timed sequence with the rotation of the turret for moving said plug member into the core opening of the pineapple at the discharge position and for moving said plug member with the pineapple whereby air pressure builds up behind the pineapple and ejects the pineapple from said chamber to said conveyor means.

6. An ejector as described in claim 5, said mechanical means including guides extending parallel to the axis of the turret chamber at the discharge position, a crosshead mounted for reciprocation on said guides and means carried by said crosshead supporting said plug member.

No references cited.